United States Patent [19]
Fraenkle et al.

[11] Patent Number: 5,845,487
[45] Date of Patent: Dec. 8, 1998

[54] METHOD AND DEVICE FOR OPERATING AN INTERNAL COMBUSTION ENGINE WITH LOW NITROGEN OXIDE EMISSIONS

[75] Inventors: Gerhard Fraenkle; Klaus-Juergen Marquartdt, both of Remshalden, Germany

[73] Assignee: Daimler-Benz AG, Germany

[21] Appl. No.: 897,769

[22] Filed: Jul. 21, 1997

[30] Foreign Application Priority Data

Jul. 19, 1996 [DE] Germany .................. 196 29 163.1

[51] Int. Cl.⁶ .................................................. F01N 3/00
[52] U.S. Cl. ............................ 60/274; 60/276; 60/285; 60/286; 60/301; 60/277
[58] Field of Search ........................ 60/274, 276, 277, 60/285, 301, 286

[56] References Cited

U.S. PATENT DOCUMENTS

| | | |
|---|---|---|
| 5,050,551 | 9/1991 | Morikawa . |
| 5,201,802 | 4/1993 | Hirota et al. ............................ 60/277 |
| 5,211,010 | 5/1993 | Hirota .................................... 60/277 |
| 5,501,074 | 3/1996 | Suetsuga et al. ...................... 60/301 |
| 5,709,080 | 1/1998 | Arora et al. ............................ 60/274 |
| 5,713,199 | 2/1998 | Takeshima et al. .................... 60/285 |

FOREIGN PATENT DOCUMENTS

| | | |
|---|---|---|
| 0 696 676 A1 | 2/1996 | European Pat. Off. . |
| 44 25 018 C1 | 6/1995 | Germany . |
| WO 83/00057 | 1/1983 | WIPO . |
| WO 94/27035 | 4/1994 | WIPO . |

*Primary Examiner*—Thomas E. Denion
*Attorney, Agent, or Firm*—Evenson, McKeown, Edwards & Lenahan, P.L.L.C.

[57] ABSTRACT

A method and an apparatus for operating an internal combustion engine, in particular a motor-vehicle diesel engine, with low nitrogen-oxide emissions, has a first mode of operation which sets an early start of fuel injection and a nitrogen-oxide reducing agent is added to the stream of exhaust gases upstream of a nitrogen-oxide-reducing exhaust-gas catalytic converter, and a second mode of operation which sets a late start of fuel injection. A temperature sensor measures the temperature of the exhaust-gas catalytic converter. The engine is operated in the second mode of operation when the measured temperature of the exhaust-gas catalytic converter lies outside a prescribable temperature range for an effective catalytic nitrogen-oxide reduction to ensure low nitrogen-oxide emissions.

4 Claims, 1 Drawing Sheet

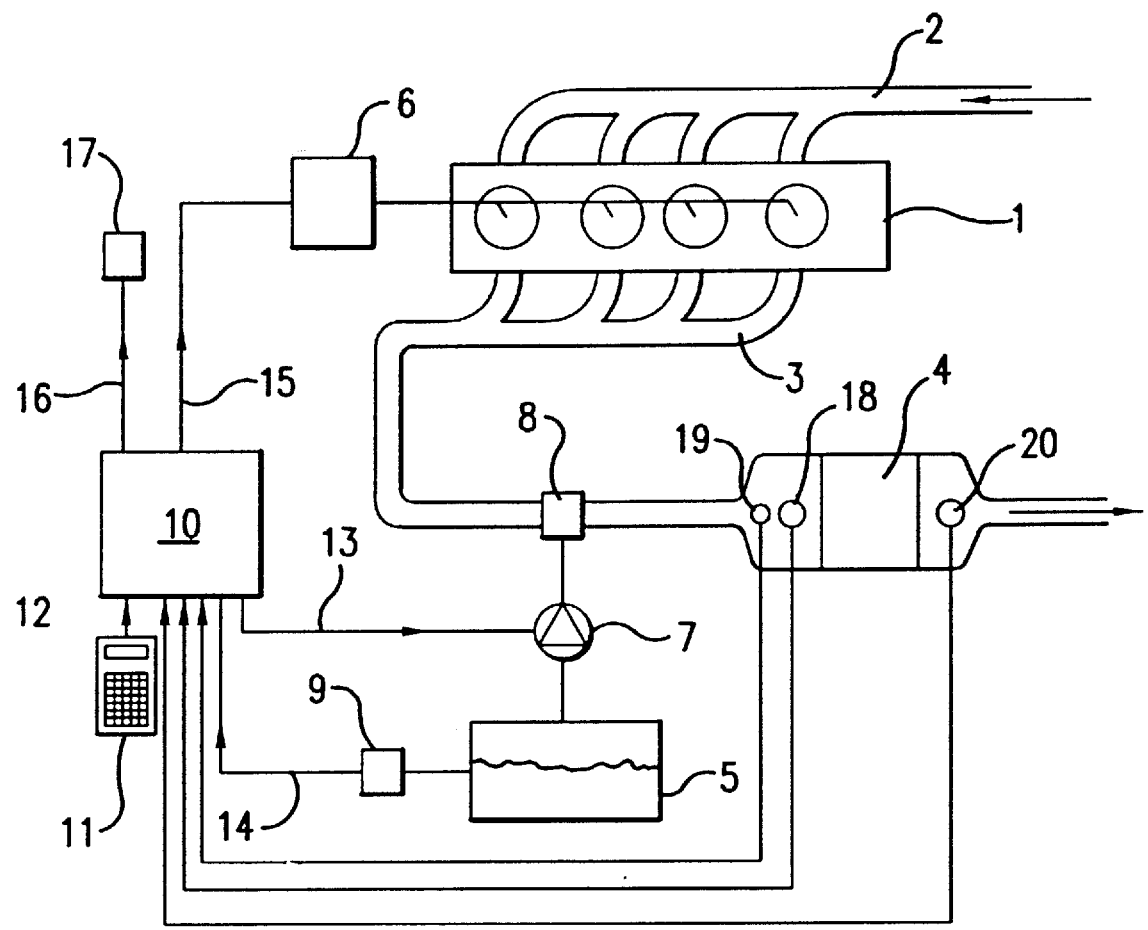

METHOD AND DEVICE FOR OPERATING AN INTERNAL COMBUSTION ENGINE WITH LOW NITROGEN OXIDE EMISSIONS

BACKGROUND AND SUMMARY OF THE INVENTION

This application claims the priority of 196 29 163.1, the disclosure of which is expressly incorporated by reference herein.

The present invention relates to a method and an apparatus for operating an internal combustion engine, in particular a motor-vehicle diesel engine, with low nitrogen oxide emissions, a first mode of operation which sets an early start of fuel injection is set and adds a nitrogen-oxide reducing agent to the stream of exhaust gases upstream of a nitrogen-oxide-reducing exhaust-gas catalytic converter, and a second mode of operation being provided which sets a late start of fuel injection.

DE 44 25 018 C1 describes an engine which is normally operated in the first mode of operation in which a comparatively early start of fuel injection is set. Compared with a later start of fuel injection, the early start of fuel injection has the advantage of a lower consumption of fuel, but also results in an increased nitrogen-oxide concentration in the engine exhaust gas increasing. This has been counteracted by adding a nitrogen-oxide reducing agent to the stream of exhaust gases in conjunction with a downstream exhaust-gas catalytic converter configured for the catalytic reduction of nitrogen oxide. In the known system, the engine is operated in the second mode of operation with a late start of fuel injection only if the nitrogen-oxide reducing agent to be fed in has been almost used up. By so setting the late start of fuel injection, the desired low emission of nitrogen oxide is ensured inside the engine while tolerating a somewhat increased fuel consumption.

WO 83/00057 also discloses a method and an apparatus for operating an internal combustion engine with low nitrogen-oxide emissions. This known method includes the addition of a nitrogen-oxide reducing agent to the stream of exhaust gases upstream of a nitrogen-oxide-reducing exhaust-gas catalytic converter and the measurement of the temperature in the exhaust-gas catalytic converter. The nitrogen-oxide-reducing agent is added here only if the measured temperature of the exhaust-gas catalytic converter lies within a prescribable temperature range for an effective catalytic nitrogen-oxide reduction.

An object of the present invention is to provide a method and an apparatus which achieves a mode of operation of the internal combustion engine with low nitrogen-oxide emissions both during starting phases of the engine and when the engine has warmed up. The mode of operation of the present invention permits the nitrogen-oxide-reducing exhaust-gas catalytic converter function to be monitored and/or constantly low nitrogen-oxide emissions to be regulated.

The foregoing object has been solved according to the present invention by providing a method in which the temperature in the exhaust-gas catalytic converter is measured, the engine is operated in the second mode of operation if the measured temperature of the exhaust-gas catalytic converter lies outside a prescribable temperature range for an effective catalytic nitrogen-oxide reduction, and the nitrogen-oxide concentration in the stream of exhaust gases is measured on the input side and on the output side of the exhaust-gas catalytic converter.

A warning signal is generated if the temperature of the exhaust-gas catalytic converter lies within the range for an effective catalytic nitrogen-oxide reduction, and the nitrogen-oxide concentration measured on the output side of the catalytic converter is greater than a prescribable fraction limit-value of the nitrogen-oxide concentration measured on the input side of the catalytic converter or the temperature in the exhaust-gas catalytic converter is measured.

The engine is operated in the second mode of operation if the measured temperature of the exhaust-gas catalytic converter lies outside a prescribable temperature range for an effective catalytic nitrogen-oxide reduction, and the nitrogen-oxide concentration in the stream of exhaust gases is measured on the output side of the exhaust-gas catalytic converter and the specific nitrogen-oxide emission is determined therefrom and the latter is set to a constant, prescribable specific nitrogen-oxide emission by suitably adjusting the start of fuel injection.

Likewise, this object has been achieved with an apparatus in which either a sensor is provided for measuring the temperature of the catalytic converter, the engine controller sets a late start of fuel injection if the measured temperature of the catalytic converter lies outside a prescribable temperature range for an effective catalytic nitrogen-oxide reduction. A nitrogen-oxide sensor is provided on the input side and on the output side, respectively, of the exhaust-gas catalytic converter, and the engine controller generates a warning signal if the temperature of the exhaust-gas catalytic converter lies within the range for an effective catalytic nitrogen-oxide reduction and the nitrogen-oxide concentration measured by the nitrogen-oxide sensor on the output side of the catalytic converter is higher than a prescribable fraction limit-value of the nitrogen-oxide concentration measured by the nitrogen-oxide sensor on the input side of the catalytic converter or a sensor is provided for measuring the temperature of the catalytic converter.

The engine controller sets a late start of fuel injection if the measured temperature of the catalytic converter lies outside a prescribable temperature range for an effective catalytic nitrogen-oxide reduction, the nitrogen-oxide concentration is measured by a nitrogen-oxide sensor arranged on the output side of the exhaust-gas catalytic converter, and the engine controller determines from the measured nitrogen-oxide concentration the associated specific nitrogen-oxide emission and sets the latter to a constant, prescribable specific nitrogen-oxide emission by suitably adjusting the start of fuel injection.

According to the method of the present invention, the temperature in the exhaust-gas catalytic converter is measured and the engine is operated in the mode of operation with a late start of fuel injection if the measured temperature of the exhaust-gas catalytic converter lies outside a prescribable temperature range for an effective catalytic nitrogen-oxide reduction. By setting a late start of fuel injection, low nitrogen-oxide emission is ensured inside the engine.

When the measured temperature of the exhaust-gas catalytic converter then lies within the prescribed range of active catalytic conversion of nitrogen oxide, the system can be changed over to the mode of operation with an early start of fuel injection, which is favorable for consumption. The nitrogen-oxide reducing agent is being fed to the stream of exhaust gases upstream of the exhaust-gas catalytic converter. The apparatus which is suitable for carrying out the foregoing improved method of operation contains a catalytic-converter temperature sensor and an engine controller which sets the mode of operation of the engine as described above.

The method according to the present invention is based on the recognition that the nitrogen-oxide-reducing, catalytic action of conventional exhaust-gas catalytic converters such as are used, for example, for motor-vehicle diesel engines, is perceptibly temperature-dependent. In particular, this catalytic nitrogen-oxide reduction action only starts above a specific minimum temperature of the catalytic converter.

The present invention achieves a mode of operation of the internal combustion engine with low nitrogen oxide emissions for the cold-start temperature range below this minimum temperature by bringing about a low nitrogen-oxide concentration in the exhaust gas inside the engine by operating the engine in the mode of operation with a late start of fuel injection. Only if the minimum temperature is exceeded will the system, if appropriate, be switched over to the mode of engine operation with a late start of fuel injection, which is more favorable for consumption, and with the further addition of nitrogen-oxide reducing agent to the stream of exhaust gases.

Also, the engine-external measure to reduce the nitrogen-oxide concentration in the exhaust gas can be monitored in order, if appropriate, for switching over to the mode of operation of the engine with a late start of fuel injection and with low nitrogen oxide emissions inside the engine, for example when the nitrogen-oxide reducing agent has almost been used up.

Furthermore, the nitrogen-oxide-reducing exhaust-gas catalytic converter action is monitored by appropriate upstream and downstream sensors, and a warning signal is generated if at least one prescribable minimum fraction of the quantity of nitrogen oxide fed into the input end is not reduced in the catalytic converter, although the temperature of the catalytic converter is in the region of effective reduction of nitrogen oxide.

With a method according to an embodiment of the present invention, the internal combustion engine is operated such that, irrespective of the particular engine load value, an essentially constant specific emission of nitrogen oxide is obtained, to which the start of fuel injection is respectively suitably adjusted. This is advantageously accompanied by a corresponding control of the apparatus for adding nitrogen-oxide reducing agent to the stream of exhaust gases. That is, when there is a late start of fuel injection, less, or even no, nitrogen-oxide reducing agent is added compared to an early start of injection.

BRIEF DESCRIPTION OF THE DRAWING

Other objects, advantages and novel features of the present invention will become apparent from the following detailed description of the invention when considered in conjunction with the accompanying drawing wherein the sole FIGURE is a schematic view of one embodiment of an apparatus in accordance with the present invention for operating an internal combustion engine with low nitrogen oxide emissions.

DETAILED DESCRIPTION OF THE DRAWING

The illustrated device is used to operate an internal combustion engine 1, for example a motor vehicle diesel engine, with low nitrogen-oxide emissions. Combustion air can be fed to the engine 1 via a line 2, while the exhaust-gas of the engine is carried away via an exhaust-gas assembly 3, in which is arranged a catalytic converter 4, of which at least one section is configured for catalytic nitrogen-oxide reduction. Fuel is injected into the engine 1 via an injection regulating unit 6 which is part of an engine controller, for example a central engine control unit, and with which both the duration of the injection and the start of injection can be regulated.

In order to reduce comparatively high nitrogen-oxide concentration in engine operating phases with an early start of fuel injection which is favorable for consumption, a system 5, 7, 8 for adding a nitrogen-oxide reducing agent are provided upstream of the catalytic converter 4 in the flow direction. The system 5, 7, 8 comprises a storage vessel 5 for storing the reducing agent, for example urea or ammonia, a mixing unit 8 which adds the reducing agent to the stream of exhaust gases in the exhaust-gas assembly 3, and a pump 7 for feeding the reducing agent from the storage vessel 5 to the mixing unit 8. The addition of the reducing agent is controlled via a pump control line 13 by way of a central control unit 10, which may be part of the engine controller, for example of a central engine control unit. The delivery quantity of the pump 7 is controlled by the central control unit 10 with the aid of various stored items of data from a data memory 11 which can read the data from the data memory 11 via a connecting line 12.

A temperature sensor 18, a first, input-side nitrogen-oxide sensor 19 and a second output-side nitrogen-oxide sensor 20 are arranged in the exhaust-gas catalytic converter 4. The measurement signals of these three sensors 18, 19, 20 are fed to the central control unit 10 via associated connecting lines. Furthermore, a filling level sensor 9 is assigned to the storage vessel 5, the output signal of which sensor 9 is also fed to the central control unit 10, via a connecting line 14.

If the central control unit 10 detects, by reference to the signal of the filling level sensor 9, that the storage vessel 5 is empty or its filling level has dropped below a prescribable minimum value, a signal is transmitted to the injection regulating unit 6 via a connecting line 15, in response to the reception of which the injection regulating unit 6 sets the engine to its mode of operation with a late start of fuel injection. In that mode of operation, a low nitrogen-oxide concentration in the exhaust gas is ensured within the actual engine. This mode prevents the engine from being operated in this situation with an early start of fuel injection, which, although favorable in terms of fuel consumption, results in comparatively high nitrogen-oxide concentrations in the exhaust gas of the engine, which concentrations can no longer be reduced outside the engine owing to the fact that the reducing agent has almost completely run out.

In order to signal the absence of reducing agent in the storage vessel 5 to the driver of the vehicle, a visual display 17 is provided in the dashboard area of the motor vehicle. The display 17 is activated by the central control unit 10 via a connecting line 16 as a function of the signal of the filling level sensor 9. In order, however, to limit the time during which the increased fuel consumption occurs, the reducing agent should be filled up again as quickly as possible. A timer switch which is connected to the filling level sensor can be provided for this purpose. The effect of the timer switch is such that without reducing agent the engine is allowed to operate only over a limited time period.

If the nitrogen-oxide-reducing exhaust-gas aftertreatment device is operative, and there is still reducing agent in particular in the storage vessel 5, the nitrogen-oxide concentration in the exhaust gas can be reduced outside the engine by adding reducing agent and by the subsequent catalytic nitrogen-oxide reduction reaction in the catalytic converter 4, with this reaction starting effectively above a certain minimum temperature. Via the temperature sensor 18, the central control unit 10 either directly detects the catalytic-converter body temperature, which is decisive for the reduction effect or detects the temperature of the exhaust gas flowing through the catalytic converter 4. In the latter case, the decisive temperature of the catalytic-converter body is calculated from the profile of the exhaust-gas temperature in the catalytic converter 4, taking into account the thermal inertia of the catalytic-converter body.

If the catalytic-converter temperature calculated in this way is below the minimum temperature for an effective catalytic nitrogen-oxide reduction, the central control unit 10 causes the start-of-injection regulating unit 6 to operate the engine in the mode of operation with a late start of fuel injection. Although this results in somewhat increased fuel consumption during such starting-mode phases, low nitrogen-oxide emission is ensured inside the engine, which, in this situation, cannot be brought about outside the engine by the nitrogen-oxide-reducing exhaust-gas aftertreatment device because of the fact that the catalytic converter 4 is still too cold.

In addition to increased fuel consumption, increased emissions of particles and hydro-carbons can also occur. These emissions can be reduced by an oxidation catalytic-converter stage arranged as a separate catalytic converter or integrated into the nitrogen-oxide-reducing catalytic converter 4.

The engine must have warmed up, i.e. the catalytic-converter temperature must have exceeded the prescribed minimum temperature, before the central control unit 10 enables the injection regulating unit 6 to switch over to the engine mode of operation with a consumption-favorable, early start of injection when the control unit 10 simultaneously detects that the nitrogen-oxide-reducing exhaust-gas aftertreatment device is intact. In this mode of operation, the still relatively high nitrogen-oxide concentration in the engine exhaust gas is then reduced by the addition of the reducing agent and the catalytic, nitrogen-oxide reducing effect of the catalytic converter 4. Of course, the central control unit 10 does not trigger the switching over to an early start of injection until the catalytic-converter body has been heated up by hot exhaust gas for a long enough time, in order to bring the body to the sufficient reaction temperature.

With the two nitrogen oxide sensors 19, 20, the operation of the catalytic converter 4 is monitored by the central control unit 10 checking, in the mode of operation with active addition of reducing agent, i.e. with exhaust-gas catalytic-converter temperature above the minimum temperature, whether the nitrogen-oxide concentration measured by the sensor 20 positioned on the output or downstream side is greater than a prescribable fraction limit-value of the nitrogen-oxide concentration measured by the sensor 19 positioned on the input or upstream side. The occurrence of this higher concentration means, that despite a sufficient catalytic-converter temperature, no effective nitrogen-oxide reduction is taking place in the catalytic converter 4 owing to some fault or other. The central control unit 10 then emits an appropriate warning signal. In typical cases, the fraction limit-value can preferably be selected in the region between 20% to 40% of the input-side nitrogen-oxide concentration.

When necessary, the operation of the engine can also be set, in particular when the engine has warmed up, to a constant specific nitrogen-oxide emission, i.e. to a specific, prescribed value of the mass of nitrogen oxide in relation to the energy generated by the engine, by appropriately adjusting the start of injection. To this end, the nitrogen-oxide concentration in the exhaust gas is measured by the output-side nitrogen-oxide sensor 20 and converted, using the necessary engine variables, in particular the engine load and the mass of exhaust gases as a total of the mass of air and the mass of injected fuel, in the central control unit 10 to the associated specific emissions value, and compared with a prescribed set-point value.

When the set-point value is exceeded, a later start up injection is then set, whereas when the value drops below the set-point value an earlier, more consumption favorable start of injection is selected, so that uniform, low nitrogen-oxide emission is obtained even for relatively large, fluctuating engine-load values. The adjustment at the start of injection can, of course, also be accompanied by corresponding activation or deactivation of the addition of nitrogen-oxide reducing agent into the stream of exhaust gases upstream of the nitrogen-oxide reducing exhaust-gas catalytic converter 4.

Although the invention has been described and illustrated in detail, it is to be clearly understood that the same is by way of illustration and example, and is not to be taken by way of limitation. The spirit and scope of the present invention are to be limited only by the terms of the appended claims.

What is claimed is:

1. Method for operating an internal combustion engine with low nitrogen-oxide emissions, comprising the steps of providing a first mode of operation in which an early start of fuel injection is set and a nitrogen-oxide reducing agent is added to a stream of exhaust gases upstream of a nitrogen-oxide-reducing exhaust-gas catalytic converter; providing a second mode of operation in which a late start of fuel injection is set, measuring temperature in the exhaust-gas catalytic converter;

operating the engine in the second mode of operation when the measured temperature of the exhaust-gas catalytic converter lies outside a prescribable temperature range for an effective catalytic nitrogen-oxide reduction; and measuring the nitrogen-oxide concentration in the stream of exhaust gases on an input side and on an output side of the exhaust-gas catalytic converter; and generating a warning signal when the temperature of the exhaust-gas catalytic converter lies within the range for an effective catalytic nitrogen-oxide reduction, and the nitrogen-oxide concentration measured on the output side of the catalytic converter is greater than a prescribable fraction limit-value of the nitrogen-oxide concentration measured on the input side of the catalytic converter.

2. Method for operating an internal combustion engine with low nitrogen-oxide emissions, comprising the steps of providing a first mode of operation in which an early start of fuel injection is set and a nitrogen-oxide reducing agent is added to a stream of exhaust gases upstream of a nitrogen-oxide-reducing exhaust-gas catalytic converter, providing a second mode of operation in which a late start of fuel injection is set;

measuring temperature in the exhaust-gas catalytic converter;

operating the engine in the second mode of operation when the measured temperature of the exhaust-gas catalytic converter lies outside a prescribable temperature range for an effective catalytic nitrogen-oxide reduction; and measuring the nitrogen-oxide concentration in the stream of exhaust gases on an output side of the exhaust-gas catalytic converter and determining the specific nitrogen-oxide emission therefrom; and setting the specific nitrogen-oxide emission to a constant, prescribable specific nitrogen-oxide emission by suitably adjusting the start of fuel injection.

3. Apparatus for operating an internal combustion engine with low nitrogen-oxide emissions, comprising a nitrogen-oxide-reducing exhaust-gas aftertreatment system configured to add a nitrogen-oxide reducing agent to the stream of exhaust gases, a downstream, nitrogen-oxide-reducing exhaust-gas catalytic converter;

an engine controller for optionally setting an early start of fuel injection when the nitrogen-oxide-reducing aftertreatment device is active or setting a late start when the measured temperature of the catalytic converter lies outside a prescribable temperature range for an effective catalytic nitrogen-oxide reduction;

a sensor configured to measure the temperature of the catalytic converter;

the engine controller sets a late start of fuel injection;

a nitrogen-oxide sensor on the input side and on the output side, respectively, of the exhaust-gas catalytic converter, and the engine controller being configured to generate a warning signal when the temperature of the exhaust-gas catalytic converter lies within the range for an effective catalytic nitrogen-oxide reduction and the nitrogen-oxide concentration measured by the nitrogen-oxide sensor on the output side of the catalytic converter is higher than a prescribable fraction limit-value of the nitrogen-oxide concentration measured by the nitrogen-oxide sensor on the input side of the catalytic converter.

4. Apparatus for operating an internal combustion engine with low nitrogen-oxide emissions, comprising a nitrogen-oxide-reducing exhaust-gas aftertreatment system configured to add a nitrogen-oxide reducing agent to a stream of exhaust gases, a downstream, nitrogen-oxide-reducing exhaust-gas catalytic converter;

an engine controller configured to optionally set an early start of fuel injection if the nitrogen-oxide-reducing aftertreatment device is active or a late start when the measured temperature of the catalytic converter lies outside a prescribable temperature range for an effective catalytic nitrogen-oxide reduction;

a sensor for measuring the temperature of the catalytic converter;

a nitrogen-oxide sensor arranged on the output side of the exhaust-gas catalytic converter to measure the nitrogen-oxide concentration; and the engine controller being configured to determine from the measured nitrogen-oxide concentration the associated specific nitrogen-oxide emission and to set the latter to a constant, prescribable specific nitrogen-oxide emission by suitably adjusting the start of fuel injection.

* * * * *